US011666943B2

(12) United States Patent
Benjamin

(10) Patent No.: US 11,666,943 B2
(45) Date of Patent: Jun. 6, 2023

(54) SIZING AND SEPARATING GRANULAR PARTICLES

(71) Applicant: Gulf Conveyor Systems Pty Ltd, Wahroonga (AU)

(72) Inventor: Colin Benjamin, Wahroonga (AU)

(73) Assignee: GULF CONVEYOR SYSTEM S PTY LTD, Wahroonga (AU)

(*) Notice: Subject to any disclaimer, the term of this patent is extended or adjusted under 35 U.S.C. 154(b) by 0 days.

(21) Appl. No.: 17/260,662

(22) PCT Filed: Jul. 17, 2019

(86) PCT No.: PCT/AU2019/050750
§ 371 (c)(1),
(2) Date: Jan. 15, 2021

(87) PCT Pub. No.: WO2020/014743
PCT Pub. Date: Jan. 23, 2020

(65) Prior Publication Data
US 2021/0260625 A1    Aug. 26, 2021

(30) Foreign Application Priority Data

Jul. 17, 2018  (AU) .................................. 2018902581
May 10, 2019  (AU) .................................. 2019901603

(51) Int. Cl.
*B07B 15/00* (2006.01)
*B07B 4/02* (2006.01)
(Continued)

(52) U.S. Cl.
CPC .............. *B07B 15/00* (2013.01); *B07B 4/025* (2013.01); *B07B 7/01* (2013.01); *B07B 7/04* (2013.01);
(Continued)

(58) Field of Classification Search
CPC ....... B07B 15/00; B07B 13/003; B07B 13/04; B07B 13/05; B07B 13/113; B07B 13/116; B07B 13/10; B07B 13/16; B07B 4/00
See application file for complete search history.

(56) References Cited

U.S. PATENT DOCUMENTS 3,356,213 A * 12/1967 Weber .................. B07B 13/003
209/638
3,904,517 A   9/1975 Wilson
4,956,078 A   9/1990 Magerowski

FOREIGN PATENT DOCUMENTS

CN    104741318 A    7/2015
DE    0482683 B1 *  7/1994
(Continued)

OTHER PUBLICATIONS

International Search Report issued by the Australian Patent Office in connection with PCT Application No. PCT/AU2019/050750 dated Sep. 6, 2019.
(Continued)

*Primary Examiner* — Howard J Sanders
*Assistant Examiner* — Jessica L Burkman
(74) *Attorney, Agent, or Firm* — Dennemeyer & Associates LLC

(57) ABSTRACT

A system and method for sizing and separating granular particles within the bulk granular solids by creating a graded granular flow comprising multiple sized fractions with gradation of the particles according to particle size between relatively fine fractions and relatively coarse fractions; and capturing at least a portion of granular flow. The system (11) comprises means (25) for creating the graded granular flow, and means (30) for capturing at least a portion of the graded granular flow. The graded granular flow is split into separate streams, one of which is subsequently captured by inter-
(Continued)

cepting that stream. The intercepted stream may be collected or redirected for further processing.

24 Claims, 3 Drawing Sheets

(51) Int. Cl.
| | |
|---|---|
| *B07B 13/00* | (2006.01) |
| *B07B 13/04* | (2006.01) |
| *B07B 13/11* | (2006.01) |
| *B07B 13/16* | (2006.01) |
| *B07B 7/01* | (2006.01) |
| *B07B 7/04* | (2006.01) |
| *B07B 13/05* | (2006.01) |
| *B65G 11/20* | (2006.01) |
| *B65G 47/42* | (2006.01) |
| *B65G 47/46* | (2006.01) |

(52) U.S. Cl.
CPC .......... *B07B 13/003* (2013.01); *B07B 13/04* (2013.01); *B07B 13/05* (2013.01); *B07B 13/113* (2013.01); *B07B 13/116* (2013.01); *B07B 13/16* (2013.01); *B65G 11/206* (2013.01); *B65G 47/42* (2013.01); *B65G 47/46* (2013.01); *B65G 2812/03* (2013.01)

(56) References Cited

FOREIGN PATENT DOCUMENTS

| | | |
|---|---|---|
| EP | 0482683 B1 | 7/1994 |
| JP | H08267009 A | 10/1996 |

OTHER PUBLICATIONS

Gray, JMNT, "Particle segregation in dense granular flows", Annual Review of Fluid Mechanics, vol. 50, pp. 407-433, Jan. 2018.
Supplementary European Search Report issued in connection with Application No. EP 19837778 dated Mar. 4, 2022.

* cited by examiner

SIZING AND SEPARATING GRANULAR PARTICLES

CROSS-REFERENCE TO RELATED APPLICATIONS

This is a 35 U.S.C. 371 National Stage Patent Application of International Application No. PCT/AU2019/050750, filed Jul. 17, 2019, which claims priority to Australian application 2018902581, filed Jul. 17, 2018 and Australian application 2019901603 filed May 10, 2019, each of which is hereby incorporated by reference in its entirety.

TECHNICAL FIELD

The present invention relates to a method and system for sizing and separating granular particles.

BACKGROUND ART

The following discussion of the background art is intended to facilitate an understanding of the present invention only. The discussion is not an acknowledgement or admission that any of the material referred to is or was part of the common general knowledge as at the priority date of the application.

The behaviour of granular particles flowing under the influence of gravity can be very complex, making the development of any accurate mathematical model impossible based on our current state of knowledge. This is due in part to the many forces that are interacting on the particles and the usual variability in particle size and size distribution. The flow behaviour is made even more complex if water is present. If, however, a very smooth and controlled flow of the granular particles is established and maintained then, through empirical work, assessments of the surface interactional forces that are in play can be made through the measurement of the "Stall Angle" (as described in WO 2014/06248).

If a mixture of granular particles (and water) are allowed to flow in a smooth and controlled manner (i.e. a flow regime where there is minimal flow disturbance thus minimising any collisional forces) under the influence of gravity, they will build-up a natural flow angle that reflects the surface interactional forces such that there is no nett acceleration of the particles. This angle will vary as the particle size distribution changes, i.e. as you remove the smaller fractions of particles, the stall angle will reduce. The Applicant has measured Stall Angles from as high as 65 degrees to as low as 35 degrees although it is anticipated that, in certain circumstances, the Stall Angle could be much lower than 35 degrees.

Further to the above, given that the smaller the particle, the greater the surface area for a given mass and therefore the greater the surface interactional forces per unit mass that could impact the way these particles will flow. This has the effect of segregating the smaller particles from the larger particles in the flow mass. This can be accentuated through mild agitation as the smaller particles can also "fall" between the larger particles.

Through a combination of the above effects and by careful attention to the angles being used, a variation in the flow dynamics of different particle sizes can be induced such that there is not only a natural separation from the top of the granular flow to the bottom of larger to smaller particles but further, the smaller particles will be flowing at a much slower speed relative to the larger particles.

The present invention seeks to utilise this phenomenon for separation of granular particles according to particle size.

The invention is particularly applicable to the materials handling industry where there may be a need to separate bulk granular solids, such as crushed ore, coal or rock, according to particle size. Accordingly, it will be convenient to hereinafter disclose the invention in relation to that exemplary application. It should, however, be appreciated that the invention may have application in other fields where there is a need to separate a bulk material comprising granular material according to particle size.

Sizing and separating granular particles has long been an integral part of any materials handling system. The purpose of sizing and separating includes:

a) removing material that is not considered product or has low commercial value such as lower grade ores in an overall flow mass of iron ore where the impurities and lower grade material tend to fragment into smaller particles when crushed;

b) taking oversize ore out of a flow mass so it can be further processed;

c) separating granular products into differential size spectrums as part of the commercial requirements of customers; and d) extracting crystallised material that has fragmented into smaller particles from a flow mass, as this crystallised material will contain a far higher concentration of valuable mineralisation such as copper mineralisation in a ore deposit that is mined and then subject to some form of fragmentation The methodologies used can vary, but generally if dry, or relatively dry, the preferred methodology of separating granular materials is to use a screening system. This can be simply described as allowing the granular material to flow over a sized aperture that permits fine materials to pass through and coarse materials to overflow. Such systems can be quite complicated in their design in order to create screening efficiency and also to increase the volumetric capacity of the screening process.

All screening systems however have a number of constraints, the following likely to be considered to be most significant:

1) In high volume bulk handling systems, the main conveyor (or similar delivery system) has a much higher capacity than the screening systems available and this requires splitting the flow stream into a large number of flow streams such that the flow streams so created match the capacity of the screen. This is usually done by feeding the stream into a series of bins, under the bins there will be some form of feeder that will in turn feed the screen. Such a system usually divides the flow stream into oversize (that is then re-sized), mid-size or lump product and under-size or fines product. Such a system requires the various streams to be re-merged usually using a conveyor system so that the various streams can be efficiently handled.

2) In all current cases the total ore mass is passed through the system which in many cases leads to double handling as much of the ore could already be of the correct size faction.

3) The screening system itself can be rendered inefficient if water is present as the finer material can agglomerate and form a cohesive mixture that blinds the screening system thus not permitting the under-size material to flow through.

4) Over-size material can damage the screens requiring frequent maintenance. Wear can also be a major factor.

5) Dust and dust management can be expensive requiring dust collection systems to meet environmental expectations.
6) The overall cost of such screening systems is very expensive requiring, in some cases, very large and tall structures.
7) Such systems are inherently very high maintenance and because of this such systems usually incorporate a significant amount of additional capacity so that one, two or three screening circuits can be taken off line for a period without impairing production.

It is against this background, and the problems and difficulties associated therewith, that the present invention has been developed.

SUMMARY OF INVENTION

According to a first aspect of the invention there is provided a method for sizing and separating granular particles according to particle size in a flow of bulk material having plural size fractions, the method comprising:

creating a flow path for said bulk material;

propelling said flow of bulk material outwardly and downwardly along a curved path under the influence of gravity to produce bulk material components having different trajectories;

performing a preliminary particle separation on said flow path to separate said flow path into plural streams of bulk material components, one of said plural streams containing bulk material components having a lower trajectory and the other of said plural streams containing remaining component material;

transforming said remaining component material in a smooth controlled downward flow in which there is minimal disturbance to said remaining component material into a graded granular flow comprising multiple sized fractions with gradation of the particles according to particle size between relatively fine fractions and relatively coarse fractions, said transformation comprising creating an inclined flow pathway for said remaining component material, said inclined flow pathway configured to adjust the flow of particles in said remaining component material by reason of differences in effective friction between said particles in said remaining component material which leads to differential speeds between particles in said remaining component material with finer particles in said remaining component material underflowing larger particles in said remaining component material and to spread said flow of remaining component material laterally within said inclined flow pathway into said graded granular flow, and capturing at least a portion of the resulting graded granular flow.

For the purpose of convenience, the granular flow comprising multiple sized fractions with gradation of the particles according to particle size between relatively fine fractions and relatively coarse fractions will hereinafter be referred to as a graded granular flow.

At least a portion of the captured granular flow may be subjected to further processing, although this need not necessarily be so. If the captured portion of the granular flow is subjected to further processing, such further processing may comprise screening.

The step of capturing at least a portion of granular flow may be performed in any appropriate way; for example, by forming said at least portion into a separate stream and intercepting that stream. The step may further comprise collecting the intercepted stream or redirecting the intercepted stream for further processing. The granular flow may be separated into at least two streams, one of which comprises the separate stream.

At least a portion of captured granular flow may be presented for screening, with smaller fractions generally below larger fractions. Presenting material for screening with smaller fractions generally below larger fractions facilitates the screening process. For instance, it will enhance screening effectiveness and/or screening efficiency.

In one arrangement, all of the graded granular flow may be captured and presented for screening, in which case said smaller fractions below larger fractions would comprise the relatively fine fractions within the granular flow.

In another arrangement, only a portion of the captured graded granular flow may be presented for screening. In such a case, if the portion presented for screening contains the relatively fine fractions, said smaller fractions below larger fractions would then comprise the relatively fine fractions. If, on the other hand, the portion presented for screening does not contain the relatively fine fractions, said smaller fractions below larger fractions would then comprise the smallest fractions remaining in the portion presented for screening. An example of an arrangement in which only a portion of the graded granular flow might be presented for screening would be where the granular flow (comprising multiple sized fractions with gradation of the particles according to particle size between relatively fine fractions and relatively coarse fractions) is separated into at least two streams, comprising a first stream containing the relatively fine fractions (along with other multiple sized fractions) and a second stream containing the relatively coarse fractions (along with other multiple sized fractions). If the first stream (containing the relatively fine fractions) were to be presented for screening, said smaller fractions below larger fractions would then comprise the relatively fine fractions. If the second stream (which does not contain the relatively fine fractions) were to be presented for screening, said smaller fractions below larger fractions would then comprise the smallest fractions remaining in the second stream.

The streams may be formed in any appropriate way. In one arrangement, the graded granular material may be directed along a curved path to induce separation of particles according to particle size to facilitate forming of the separate stream. More particularly, the graded granular material may be caused to flow along a curved path under the influence of gravity to further induce separation of particles according to particle size. For instance, the graded granular material may be caused to flow through the air along a curved path under the influence of gravity. Components of the graded granular material may not all have the same trajectory along the curved path, a phenomenon which may be utilised to facilitate the separation into the first and second streams. More particularly, certain components may have a lower trajectory than other components; for example, smaller fractions would typically have a lower trajectory than larger fractions. The separation into first and second streams may be performed by separately capturing material having different trajectories.

It should be appreciated that the gradation of particles within the granular flow is not likely to be a precise gradation but rather a generally broad gradation, with some comingling of particles between the relatively fine fractions and relatively coarse fractions.

The granular flow along the curved path may be split, with material in the granularflow having a lower trajectory being influenced in one direction and other material being influenced in another direction.

As indicated above, the graded granular flow is created by providing a smooth controlled flow path under the influence of gravity along which there is minimal disturbance to the flow mass.

The smooth controlled flow under the influence of gravity is typically established in a transfer chute.

Accordingly, in a second aspect the present invention provides a system for sizing and separating granular particles according to particle size in a flow of bulk material having plural granular particle size fractions, the system comprising:

a conveyor for creating a flow path for said bulk material and for propelling said flow of bulk material outwardly and downwardly along a curved path under the influence of gravity to produce bulk material components having different trajectories;

a preliminary particle separator for performing a preliminary particle separation on said flow path to separate said flow path into plural streams of bulk material components, one of said plural streams containing bulk material components having a lower trajectory and the other of said plural streams containing remaining component material;

a transfer chute for transforming said remaining component material in a smooth controlled downward flow in which there is minimal disturbance to the remaining component material, into a graded granular flow comprising multiple sized fractions with gradation of the particles in said graded granular flow according to particle size between relatively fine fractions and relatively coarse fractions, said transfer chute comprising a chute body, an entrance zone, a discharge zone, and an inclined flow pathway intermediate said entrance and discharge zones, said inclined flow pathway configured to adjust the flow of particles in said remaining component material by reason of differences in effective friction between said particles in said remaining component material which leads to differential speeds between particles in the remaining component material with finer particles in said remaining component material underflowing larger particles in said remaining component material and to spread said flow of remaining component material laterally within said inclined flow pathway into said graded granular flow, whereby to create said graded granular flow exiting said transfer chute, and wherein at least a portion of the resulting graded granular flow is captured As indicated above, the transfer chute has an entrance zone, a discharge zone, and a flow pathway between the entrance and discharge zones, with the entrance zone receiving a flow of a granular mixture which becomes said smooth controlled flow under the influence of gravity within the pathway. The arrangement is configured to spread the smooth controlled flow laterally within the pathway, rather than to consolidate the flow as occurs in a conventional transfer chute.

The transfer chute may present a surface upon which the granular mixture incoming through the entrance zone impinges and which directs the incoming granular mixture downwardly along the pathway as said smooth controlled flow under the influence of gravity to provide the graded granular flow. The angle at which the surface intercepts the incoming granular mixture is preferably selected to achieve flow downwardly across the surface as a sliding flow with little or no impact on the surface.

As also indicated above, the method comprises performing a preliminary particle separation on a flow of bulk material to remove certain components prior to creating the graded granular flow to remove certain components prior to creating the graded granular flow.

The preliminary particle separation may, for example, be for the purpose of removing material that may be problematic for later screening. In the case of bulk granular solids such as crushed ore, coal or rock, the preliminary separation may be for the purpose of removing wet cohesive material (usually minus 100 microns in size) which might otherwise create screening problems.

Following preliminary separation, the bulk material (e.g. the remaining portion of the flow of bulk granular solids) may constitute the granular mixture entering the transfer chute through the entrance zone.

Typically, the flow of bulk material would be created by discharging bulk granular solids from a transport system (such as a belt conveyor), with the discharging bulk granular solids being propelled along a curved path. More particularly, the graded granular material would be propelled outwardly and downwardly through the air along a curved path under the influence of gravity. The components of the discharging bulk granular solids do not all have the same trajectory, a phenomenon which may be utilised to facilitate the preliminary separation discussed above. More particularly, certain components may have a lower trajectory than other components; for example, in the case of bulk granular solids such as crushed ore, coal or rock, any wet cohesive material present (usually under 100 microns in size) would typically have a lower trajectory than other components. The initial separation may be performed by separately capturing material having different trajectories. The bulk material flowing along the curved path may be split, with material in the flow having a lower trajectory being influenced in one direction and other material being influenced in another direction. This may be done by way of a splitter system, with material having a lower trajectory being influenced in one direction by the splitter system and the remaining material being influenced in another direction by the splitter system. The remaining material may, for example, be directed by the splitter system to the transfer chute for creating said gravity-flow.

The components removed by the preliminary separation may be collected.

The screening may comprise one or more screening stages.

Particles rejected by the screening may be collected.

The components removed by the preliminary separation, the particles received from the other zone, and the particles rejected by the screening may all constitute unwanted material, in which case it may be brought together and discarded. Conversely, components removed by the preliminary separation, the particles received from the other zone, and/or the particles rejected by the screening may contain a higher proportion of desirable ore as in the case of crystallised mineralisation occurring in a host rock, in which case it is preferentially stored as high grade material.

If water is present it may be necessary to adjust the moisture levels in material comprising the granular flow to avoid the smaller particles adhering to the larger particles. This may be done in any appropriate way; for example, through either drying the material comprising the granular flow mass or adding more water so the water content is optimised so that there is minimal carryover of under size particles through them adhering to the larger particles.

Means for capturing said at least a portion of granular flow may be in any appropriate form. In one arrangement, said at least portion of the graded granular flow may be formed into a separate stream and said capturing means may comprise means for intercepting that stream. The capturing means may further comprise means for collecting or redirecting the intercepted stream. The means for collecting or redirecting the intercepted stream may be in the form of a receiver such as transfer chute or other device or receptacle in the path of that stream.

The transfer chute is preferably configured to spread said flow of a granular mixture laterally within the pathway, rather than to consolidate the flow as occurs in a conventional transfer chute, thereby facilitating the creation of the graded granular flow.

The transfer chute may present a surface upon which the granular mixture incoming through the entrance zone impinges and which directs the incoming granular mixture downwardly along the pathway under the influence of gravity. The angle at which the surface intercepts the incoming granular mixture is preferably selected to achieve flow downwardly across the surface as a sliding flow with little or no impact on the surface.

The screen may comprise part of a screening system having a plurality of screens. The plurality of screens may operate in series. Where there are a series of screens, material may advance sequentially from one screen to the next, thus successively further separating the granular material into graded batches.

The separation system according to the invention may further comprise means for performing a preliminary separation on a flow of bulk granular solids to remove certain components prior to creating the graded granular flow.

Typically, the flow of bulk material would be created by discharging bulk granular solids from a transport system (such as a belt conveyor), with the discharging bulk granular solids being propelled along a curved path. The means for performing a preliminary separation may comprise means for separately capturing material having different trajectories. In one arrangement, the means for performing a preliminary separation comprises a splitter system, with material having a lower trajectory being influenced in one direction by the splitter system and the remaining material being influenced in another direction by the splitter system. The remaining material may, for example, be directed by the splitter system to said means for creating said gravity-flow (e.g. the transfer chute).

The system may further comprise a second transfer chute configured to receive component material removed by the preliminary separation, unwanted particles separated by said means for creating said gravity-flow (e.g. the transfer chute), and the particles rejected by the screening process.

With this arrangement, all this material may be brought together in the second transfer chute and delivered to a common location. The common location may comprise a transport system (such as a belt conveyor) operating in conjunction with the second transfer chute to receive and carry the material away.

The system may further comprise a transfer chute configured to receive target material from each screen, and an associated transport system (such as a belt conveyor) operating in conjunction with the respective transfer chute to receive and carry away the target material.

BRIEF DESCRIPTION OF THE DRAWINGS

Further features of the present invention are more fully described in the following description of a non-limiting embodiment thereof. This description is included solely for the purposes of exemplifying the present invention. It should not be understood as a restriction on the broad summary, disclosure or description of the invention as set out above.

The description will be made with reference to the accompanying drawings in which.

Figure 1:
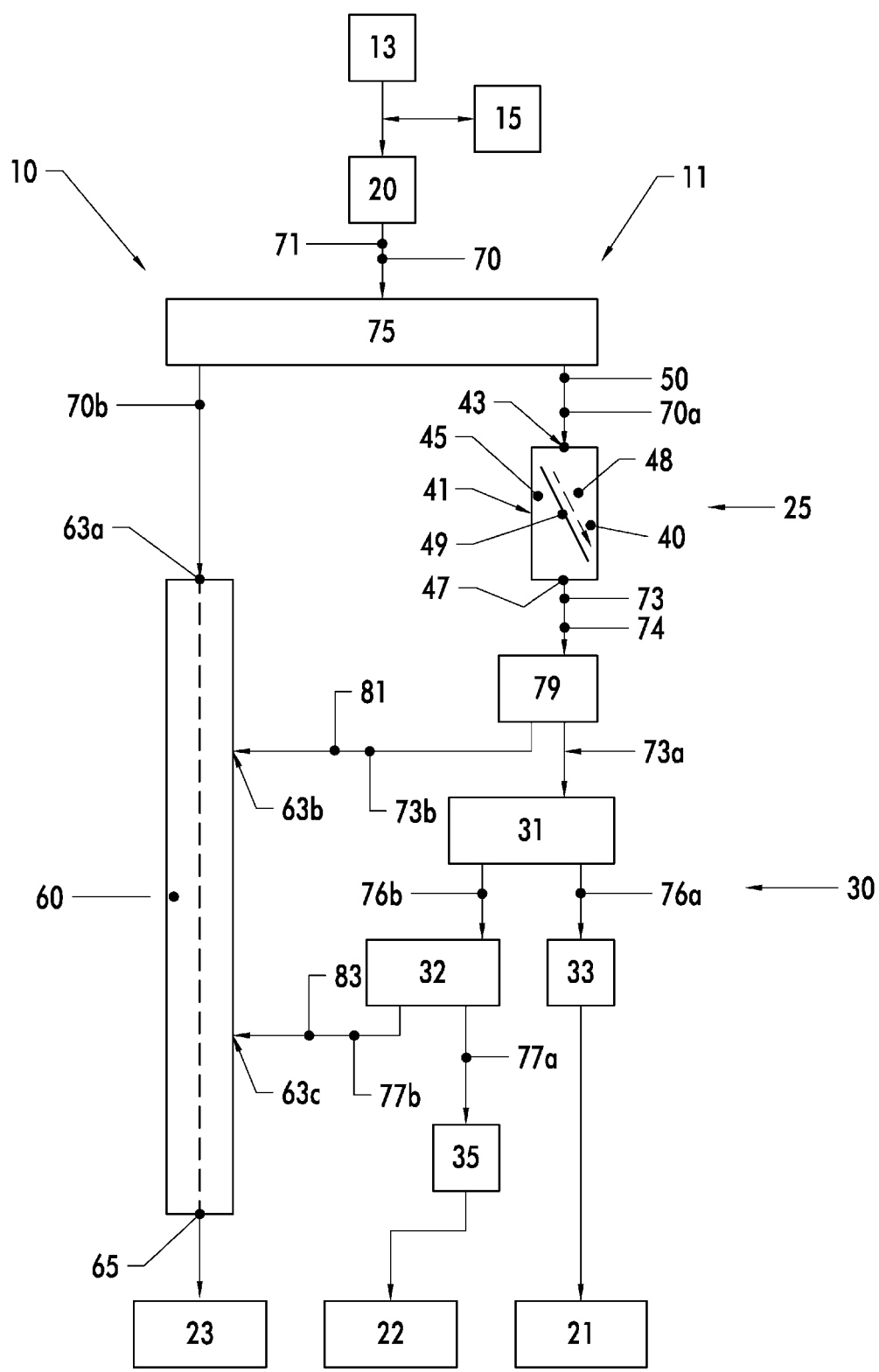
FIG. 1 is a schematic view in block diagram form of an embodiment of a separation system according to the invention.
Figure 2:
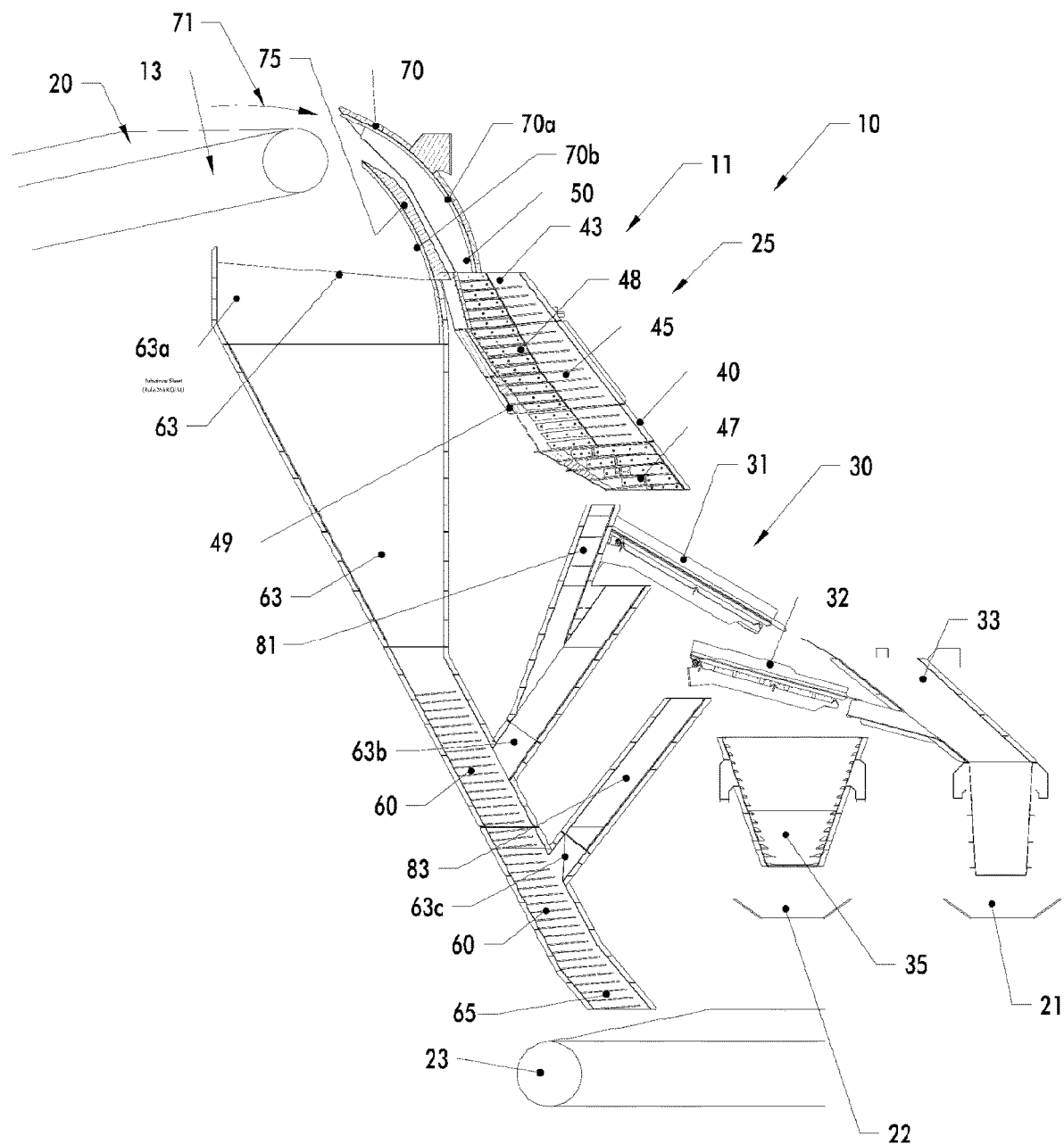
FIG. 2 is a schematic elevational view of the separation system depicted in FIG. 1.

The drawing shown is not necessarily to scale, with emphasis instead generally being placed upon illustrating the principles of the present invention.

The figure depicts an embodiment of the invention. The embodiment illustrates a certain configuration; however, it is to be appreciated that the invention can take the form of many configurations, as would be obvious to a person skilled in the art, whilst still embodying the present invention. These configurations are to be considered within the scope of this invention.

DESCRIPTION OF EMBODIMENT

Referring to the drawings, there is shown a materials handling system 10 for bulk material in the form of bulk granular solids, such as for example crushed ore, coal or rock.

The materials handling system 10 comprises a system 11 for sizing and separating granular particles within the bulk granular solids. In the arrangement shown, the system 11 separates the granular particles into three batches. In other arrangements (not shown), the system may be configured to separate the granular particles into fewer than three batches or more than three batches.

The three batches produced by this embodiment comprise two batches of target material and one batch of other material, as will be described further later. The other material may be useful for some purpose (other than target material) or it may constitute unwanted material in which case it may be discarded.

The materials handling system 10 comprises a delivery conveyor 20 for delivering bulk granular solids 13 to the system 11, and three further conveyors 21, 22 and 23 for transporting the batches away from the system 11. More particularly, conveyers 21 and 22 are each provided to receive a respective one of the two batches of target material, and conveyer 23 is provided to receive the batch of the other material.

The system 11 comprises means 25 for creating a graded granular flow (being a granular flow comprising multiple sized fractions with gradation of the particles according to particle size between relatively fine fractions and relatively coarse fractions), and means 30 for capturing at least a portion of the graded granular flow. In the arrangement shown, the graded granular flow is split into separate streams, one of which is subsequently intercepted, as will be explained later.

If water is present it may be necessary to adjust the moisture levels in the material comprising the bulk granular solids 13 to avoid the smaller particles adhering to the larger particles. This may be through either drying the material comprising the granular flow mass or adding more water to the material so the water content is optimised so that there is minimal carryover of under size particles through them adhering to the larger particles. In FIG. 1, the step of optionally adjusting the moisture levels in the material comprising the bulk granular solids 13 is identified by reference numeral 15.

In the arrangement shown, the means 30 further comprises a screen system comprising two screens 31, 32 operating in series. The first screen 31 is adapted to intercept and receive a portion of the graded granular flow for screening, with overflow material being delivered to conveyor 21 via transfer chute 33 and underflow material being delivered to second screen 32 for further screening. The second screen 32 is adapted to screen the material received from the first screen 31, with the resultant overflow material being delivered to conveyor 22 via transfer chute 35. With this arrangement, the screen system further separates the intercepted portion of the graded granular flow into two batches of target material of different grades, one being a first batch received and carried by away by conveyor 21 and the other being a second batch received and carried by away by conveyor 22.

The means 25 for creating a graded granular flow comprises a primary transfer chute 40. The primary transfer chute 40 comprises a chute body 41 defining an entrance zone 43 having an entrance opening, an intermediate zone 45, and a discharge zone 47. The chute body 41 defines a pathway 48 along which the bulk materials can flow under the influence of gravity from the entrance zone 43 to the discharge zone 47. The chute body 41 has an inclined or angular rear wall 49 and the pathway 48 is disposed internally adjacent the rear wall 49. Accordingly, the pathway 48 is downwardly inclined.

In some respects the transfer chute 40 is similar in concept to the transfer chute disclosed in WO 2014/026248, the contents of which are incorporated herein by way of reference. However, the transfer chute disclosed in WO 2014/026248 features a pathway configured to initially allow material to freely flow and to then consolidate the flow through reduction of angles lower down within the pathway to below the stall angle (as described in WO 2014/026248) to create a circumstance where the material creates its own balanced flow angle (being the angle of the flow surface presented by the accumulated material to material flow within the transfer chute). This is not so with the present invention. Rather, with the present invention, the pathway 48 is configured to spread the flow of a granular mixture laterally within the pathway 48, thereby facilitating the creation of the graded granular flow; that is, a granular flow comprising multiple sized fractions with gradation of the particles according to particle size between relatively fine fractions and relatively coarse fractions.

It is notable that the inclination of pathway 48 would likely be greater than the stall angle featured in the transfer chute disclosed in WO 2014/026248.

As described in WO 2014/026248, in the design of a transfer chute the controlled accumulation and build-up of material in a flow pathway of the transfer chute is created by adopting a stall angle as defined therein.

In one embodiment as described therein, the adopted stall angle may comprise the worst case stall angle, that is, the highest stall angle for the materials to be handled. It may comprise a constant value regardless of the material type and the material properties. Typically the adopted stall angle will comprise an angle in the range of 60 to 65 degrees from horizontal. More typically the adopted stall angle will be about 63 degrees from horizontal when cohesive and/or adhesive ores are being handled.

A consequence of the foregoing is, as described in WO 2014/0262428, a controlled accumulation and build-up of material in the transfer chute, whereby the bed depth of accumulated material is increased.

In the case of the present invention, the inclination of pathway 48 would likely be greater than the highest stall angle for the materials to be handled, and typically greater than an adopted stall angle in the range of 60 to 65 degrees, and more typically greater than about 63 degrees when cohesive and/or adhesive ores are being handled.

As a result, accumulation and build-up of material in the transfer chute 40, whilst still controlled, is thought to be lessened, allowing material to continue to flow, and bed depth in the transfer chute 40 is promoted more laterally by reason of the lateral spread of material in the transfer chute 40, thereby facilitating the creation of a graded granular flow.

As will be explained shortly, a granular mixture 50 comprising multiple sized fractions ranging from relatively fine fractions (i.e. relatively smaller particles) to relatively coarse fractions (i.e. relatively large particles) is introduced into the primary transfer chute 40 through the entrance zone 43. The transfer chute 40 presents a surface upon which the granular mixture 50 incoming through the entrance zone 43 impinges and which directs the incoming granular mixture 50 downwardly along the pathway 48 under the influence of gravity as a smooth controlled flow. The angle at which the surface intercepts the incoming granular mixture 50 is preferably selected to achieve flow downwardly across the surface as a sliding flow with little or no impact on the surface. The pathway 48 is configured to allow the smooth controlled flow to spread laterally within the pathway as the smooth controlled flow flows downwardly over the rear wall 49 under the influence of gravity.

As previously explained, smaller particles within the smooth controlled flow have a larger surface area for any given mass, and therefore have a higher effective friction given such forces have a direct proportional relationship to surface area. The differences in effective friction between particles lead to differential speeds between various particles, with smaller particles travelling at lower velocities than larger particles. As a consequence of the differential speeds, smaller particles underflow larger particles and migrate towards the rear wall 49, leading to gradation of particles according to particle size within the granular flow 50; specifically, laterally across the flow. Consequently, the granular flow leaving the transfer chute 40 at the discharge zone 47 is graded laterally according to particle size between relatively fine fractions and relatively coarse fractions. In other words, the granular flow leaving the transfer chute 40 comprises the graded granular flow. The grading of particles within the graded granular flow is not likely to be precise but rather is generally broad, with some comingling of particles between the relatively fine fractions and relatively coarse fractions. Nevertheless, the grading is useful for the purposes of the subsequent screening performed by the screen system.

The system 11 comprises a secondary transfer chute 60 having a chute body 61 with an entrance zone 63a located adjacent the entrance zone 43 of the primary transfer chute 40 and a discharge zone 65 configured to deliver material on the third conveyor 23.

Bulk material 70 comprising the bulk granular solids 13 is delivered by delivery conveyor 20 to the system 11 for sizing and separating granular particles within the bulk granular solids. The bulk material 70 may comprise the original bulk granular solids 13 or the original bulk granular solids 13 modified by addition or removal of water.

In this embodiment, a preliminary separation process is performed on the bulk material 70 delivered by the delivery conveyor 20 to remove certain components prior to creation of the graded granular flow. The preliminary separation may, for example, be for the purpose of removing material that may be problematic for later screening. In the case of bulk granular solids such as crushed ore, coal or rock, the preliminary separation may be for the purpose of removing wet cohesive material (usually minus 100 microns in size) which might otherwise create screening problems. Following preliminary separation, the remaining portion of the material 70 constitutes the granular mixture 50 entering the transfer chute 40 through the entrance zone 43.

During preliminary separation, material 70 discharging from the delivery conveyor 20 is propelled outwardly and dowanwardly through the air along a curved path 71 under the influence of gravity. The components of the discharging bulk material 70 do not all have the same trajectory along the curved path 71. More particularly, certain components have a lower trajectory than other components; for example, the case of bulk material such as crushed ore, coal or rock, any wet cohesive material present would typically have a lower trajectory than other components. The separation of particles within the discharging bulk material 70 is not likely to be a precise gradation but rather a generally broad gradation, with some comingling of particles between relatively fine fractions and relatively coarse fractions.

The initial separation may be performed by separately capturing material having different trajectories. This may be done in the present embodiment by way of a splitter system 75 aligned with the curved path 71; specifically, the splitter system 75 is disposed to confront the oncoming stream of bulk material 70 flowing along the curved path 71. The splitter system 75 is operable to divide the oncoming stream of bulk material 70 into two streams, one 70*b* containing component material having a lower trajectory and the other 70*a* containing the remaining component material. The stream 70*b* containing component material having a lower trajectory is directed by the splitter system 75 to flow into the secondary transfer chute 60 through the entrance zone 63, and the stream 70*a* containing the remaining component material is directed by the splitter system 75 to flow into the primary chute 40 through the entrance zone 43. In this way, a preliminary separation process is performed on the bulk material 70 delivered by the delivery conveyor 20 to remove certain components prior to the granular mixture 50 being transformed into the graded granular flow.

Within the transfer chute 40, the stream 70*a* is transformed into graded granular flow 73 in the manner previously explained.

As mentioned above, the screen system comprising screens 31, 32 is provided to further separate graded granular flow 73 discharging from the primary transfer chute 40 into batches.

In this embodiment only a portion of the graded granular flow 73 is presented for screening. In another embodiment (not shown), all of the graded granular flow 73 may be presented for screening.

Figure 3:
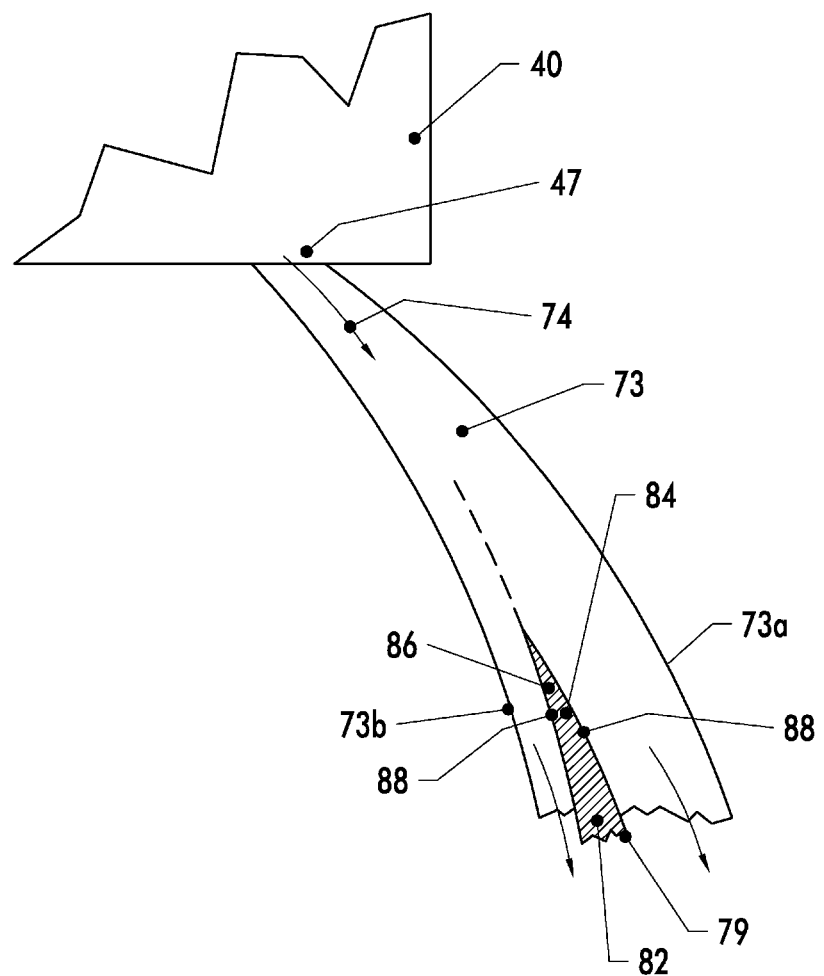
FIG. 3 is a schematic view of granular material within the separation system moving through the air along a curved path under the influence of gravity and being split into two streams, one comprising material having a lower trajectory than the other.

In the arrangement shown in FIG. 3, the graded granular flow 73 discharging from the primary transfer chute 40 is separated into two streams, being a first stream 73*a* predominately containing the relatively coarse fractions (along with other multiple sized fractions), and a second stream 73*b* predominately containing the relatively fine fractions (along with other multiple sized fractions).

More particularly, the graded granular flow 73 discharging from the primary transfer chute 40 is directed along a curved downward path 74. The discharging graded granular flow 73 spills angularly (i.e. not vertically) from the discharge zone 47 of the transfer chute 40, thereby having a horizontal component of motion which leads to the curved downward path under the influence of gravity. Components of the material comprising the graded granular material do not all have the same trajectory along the curved path 74, leading to further separation within the graded granular flow 73. Specifically, certain components may have a lower trajectory than other components; for example, smaller fractions would typically have a lower trajectory than larger fractions, facilitating further separation within the graded granular flow 73. However, the gradation would not in reality be so distinct, as separation of particles within the granular flow 73 is not likely to be a precise gradation but rather a generally broad gradation, with some comingling of particles between the relatively fine fractions and relatively coarse fractions.

A splitter system 79 similar to splitter system 75 described above may be used to divide the graded granular flow 73 discharging from the primary transfer chute 40 into the first and second streams 73*a*, 73*b*. The splitter system 79 would typically be aligned with the curved path 74. Specifically, the splitter system 79 would be disposed to confront the oncoming graded granular flow 73 flowing along the curved path 74, with material having a lower trajectory being influenced in one direction by the splitter system and the remaining material being influenced in another direction.

In the arrangement shown, the splitter system 79 comprises a splitter 82 disposed to confront the oncoming the granular flow 73. The splitter 82 is operable to divide the oncoming granular flow 73 into two stream portions 73*a*, 73*b*, of which lower stream portion 73*b* contains component material having a lower trajectory and upper stream portion 73*a* contains the remaining component material. The lower stream portion 73*b* underflows the splitter 82 and the upper stream portion 73*a* overflows the splitter.

In this embodiment, the splitter 82 comprises a body 84 presenting a leading edge 86 to oncoming granular flow 14 and two sides 88 which diverge with respect to each other in the flow to divide the oncoming granular flow 73 into the two distinct stream 73*a*, 73*b*. Each side 88 is configured (e.g. curved or profiled) to conform generally to the curved trajectory of path 74, so as to gently redirect the oncoming granular flow 73 into the two distinct stream 73*a*, 73*b*. More particularly, the splitter 82 is configured to redirect the oncoming granular flow 73 without creating a disturbance or turbulence in stream 73*a* which otherwise might adversely disturb the gradation of particles to the extent of causing re-mixing of particles within the stream 73*a*.

The first stream 73*a* (which predominately contains material other than the relatively small fractions) advances to the screen system. More particularly, the first stream 73*a* is intercepted by and flows onto the first screen 31. The second stream 73*b* (which predominately contains the relatively small fractions) is intercepted and diverted by way of diversion duct 81 to entrance zone 63*b* of the secondary transfer chute 60 for delivery to the third conveyor 23.

As the first stream 73*a* has been derived from the graded granular flow 73, it too has multiple-sized fractions with gradation of the particles according to particle size between relatively fine fractions and relatively coarse fractions. Consequently, the first stream 73*a* intercepted by the first screen 31 is presented for screening with the smaller fractions below larger fractions. As previously mentioned, presenting material for screening with smaller fractions generally below larger fraction may facilities the screening process. For instances, it may potentially enhance screening effectiveness and/or screening efficiency.

At the first screen 31, the first stream 73*a* is separated into an overflow stream 76*a* comprising overflow material, and an underflow stream 76*b* comprising underflow material. The overflow stream 76*a* (comprising overflow material from the first screen 31) is delivered to conveyor 21 via the transfer chute 33 and the underflow stream 76*b* (comprising underflow material from the first screen 31) is delivered to the second screen 32 for further screening.

At the second screen 32, the overflow stream 76*a* containing overflow material from the first screen 31 is separated into an overflow stream 77*a* comprising overflow material and an underflow stream 77*b* comprising underflow material. The overflow stream 77*a* comprising overflow material from the second screen 32 is delivered to conveyor 22 via transfer chute 35, and the underflow stream 77*b* comprising underflow material from the second screen 32 is diverted to entrance zone 63*c* of the secondary transfer chute 60 via diversion duct 83.

With this arrangement, the screen system further separates the graded granular flow into two batches of target material of different grades, one being a first batch received and carried by away by conveyor 21 (i.e. overflow material 76*a* from the first screen 31) and the other being a second batch received and carried by away by conveyor 22 (i.e. overflow material 77*a* from the second screen 32).

From the foregoing, it is evident that the second transfer chute 60 is configured to receive component material removed from the bulk granular solids at various stages within the system 11. With this arrangement, all removed component material may be brought together in the second transfer chute 60 and delivered to a common location for delivery onto third conveyor 23 to be carried away. If not useful for another purpose, the removed component material may be discarded.

It is a feature of the embodiment that the system 11 can accommodate the full volumetric capacity of the delivery conveyor 20. Broadly, multiple size fractions are progressively removed within the system 11, commencing with fine fractions. Specifically, the preliminary separation process enables removal of wet cohesive material (which is always undersize, usually minus 100 microns). This preliminary separation is performed by the splitter system 75, as described above. The remaining material is then graded broadly in primary transfer chute 40 and unwanted (undersize) material optionally intercepted and removed prior to screening. The process of creating differential flow speeds based on particle size means that undersize material will generally underflow larger particles. The combination of undersize material having a slower speed and underflowing the flow mass is particularly advantageous as it is conducive to easy and early removal of the undersized material in the screening process. The screening process further separates particles according to size. The first screen 31 in the screen system is particularly suitable for screening undersize material which is travelling much slower and below the coarser material. The fact that the undersize material is travelling much slower than and below the coarser material is conducive to easier and more efficient screening. The second screen 32 in the screen system is particularly suitable for screening lump product (the next granular fraction that needs to be collected), as it will not be travelling as fast as the oversize material and hence can be removed relatively easily ad efficiently.

The screens 31, 32 may require agitation or vibration in order to ensure material flow across the screens, as would be understood by a person skilled in the art.

Further, the screens 31, 32 may benefit from perforated surface configurations which resist occlusion by trapped material.

While the embodiment had been described and illustrated with the screen system having two screens 31, 32, it should be understood that in certain circumstances only one screen may be required and in other circumstances more than two screens may be required.

In the embodiment described and illustrated, at least a portion of the graded granular flow was captured and subjected to screening. However, there may be applications where the captured portion of the graded granular flow may not undergo screening. The captured portion of the graded granular flow may, for example, be processed or used in some other way (which might not involving screening). The step of capturing the requisite portion of granular flow may be performed in any appropriate way; for example, by forming the requisite portion of the graded granular flow into a separated stream and collecting or redirecting that stream. In one arrangement, the graded granular material may be directed along a curved path and the trajectory of the requisite portion then intercepted, in somewhat of a similar way to that discussed in relation to the embodiment discussed above. The separated stream may be captured by a system for intercepting and collecting or redirecting that stream. This system may comprise a receiver such as transfer chute, diversion duct or other device disposed in the path of that stream.

The foregoing disclosure is intended to explain how to fashion and use the particular embodiment described, rather than to limit the true, intended, and fair scope and spirit of the invention. The foregoing description is neither intended to be exhaustive, nor to be limited to the precise forms disclosed.

Further, it should be appreciated that various modifications can be made without departing from the principles of the invention. Therefore, the invention should be understood to include all such modifications within its scope.

The terminology used herein is for the purpose of describing a particular example embodiment only and is not intended to be limiting.

As used herein, the singular forms "a", "an" and "the" may be intended to include the plural forms as well, unless the context clearly indicates otherwise.

The method steps, processes, and operations described herein are not to be construed as necessarily requiring their performance in the particular order discussed or illustrated, unless specifically identified as an order of performance. It is also to be understood that additional or alternative steps may be employed.

Reference to any positional descriptions, such as "top", "bottom" and "side", are to be taken in context of the embodiment described and illustrated, and are not to be taken as limiting the invention to the literal interpretation of the term but rather as would be understood by the skilled addressee.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the apparatus in use or operation in addition to the orientation depicted in the figures.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiment When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A method of sizing and separating granular particles according to particle size in a flow of bulk material having plural granular particle size fractions, the method comprising: creating a flow path for said bulk material;
   propelling said flow of bulk material outwardly and downwardly through the air along a curved path under the influence of gravity to produce bulk material components having different trajectories;
   performing a preliminary particle separation on said flow path to separate said flow path into plural streams of bulk material components, one of said plural streams containing bulk material components having a lower trajectory and the other of said plural streams containing remaining component material;
   transforming said remaining component material in a smooth controlled downward flow in which there is minimal disturbance to said remaining component material into a graded granular flow comprising multiple sized fractions with gradation of the particles according to particle size between relatively fine fractions and relatively coarse fractions, said transformation comprising creating an inclined flow pathway for said remaining component material, said inclined flow pathway configured to adjust the flow of particles in said remaining component material by reason of differences in effective friction between said particles in said remaining component material which leads to differential speeds between particles in said remaining component material with finer particles in said remaining component material underflowing larger particles in said remaining component material and to spread said flow of remaining component material laterally within said inclined flow pathway into said graded granular flow, and
   capturing at least a portion of the resulting graded granular flow.

2. The method according to claim 1, wherein said preliminary particle separation comprises contacting said flow path with a splitter to separate said flow path into said plural streams of bulk material components in a manner which does not create disturbance or turbulence in said flow path which might adversely result in re-mixing of particles in said flow path.

3. The method according to claim 2, wherein said transformation further comprises impinging said remaining component material at an angle within a transfer chute and directing said remaining component material downwardly along said flow pathway as said smooth controlled flow under the influence of gravity to assist in transforming said remaining component material into said graded granular flow.

4. The method according to claim 3, wherein said remaining component material impinges upon a surface disposed at said angle within said transfer.

5. The method according to claim 4, wherein the angle at which said remaining component material impinges upon said surface is selected to achieve flow of said remaining component material laterally across said surface as a sliding flow as said remaining component material flows downwardly along said inclined flow pathway.

6. The method according to claim 5, wherein said angle is greater than an adopted stall angle for granular particles to be sized and separated.

7. The method according to claim 6, wherein said angle is greater than an adopted stall angle in the range of 60 to 65 degrees.

8. The method according to claim 1, further comprising a step of screening at least a portion of said captured graded granular flow, with smaller fractions generally below larger fractions.

9. The method according to claim 1, wherein said step of capturing at least a portion of said resulting graded granular flow comprises forming said at least a portion of said resulting graded granular flow into a separate stream and intercepting said separate stream.

10. The method according to claim 9 wherein the graded granular flow is created by providing a smooth controlled flow path under the influence of gravity along which there is minimal disturbance to the flow mass.

11. The method according to claim 9, wherein said at least a portion of said resulting graded granular flow is separated into at least two streams, one of which comprises said separate stream.

12. The method according to claim 11, wherein said at least a portion of said resulting graded granular flow is caused to flow through the air under the influence of gravity along a curved pathway to induce separation of particles according to particle size to facilitate forming said separate stream.

13. The method according to claim 12, wherein said at least a portion of said resulting graded granular flow along said curved pathway is split and wherein material in said resulting graded granular flow having a lower trajectory is influenced in one direction and other material is influenced in another direction.

14. The method according to claim 13, further comprising the step of adjusting the moisture level in material comprising said flow of bulk material.

15. A system for sizing and separating granular particles according to particle size in a flow of bulk material having plural granular particle size fractions, said system comprising:
- a conveyor for creating a flow path for said bulk material and for propelling said flow of bulk material through the air outwardly and downwardly along a curved path under the influence of gravity to produce bulk material components having different trajectories;
- a preliminary particle separator for performing a preliminary particle separation on said flow path to separate said flow path into plural streams of bulk material components, one of said plural streams containing bulk material components having a lower trajectory and the other of said plural streams containing remaining component material;
- a transfer chute for transforming said remaining component material in a smooth controlled downward flow in which there is minimal disturbance to the remaining component material, into a graded granular flow comprising multiple sized fractions with gradation of the particles in said graded granular flow according to particle size between relatively fine fractions and relatively coarse fractions, said transfer chute comprising a chute body, an entrance zone, a discharge zone, and an inclined flow pathway intermediate said entrance and discharge zones, said inclined flow pathway configured to adjust the flow of particles in said remaining component material by reason of differences in effective friction between said particles in said remaining component material which leads to differential speeds between particles in the remaining component material with finer particles in said remaining component material underflowing larger particles in said remaining component material and to spread said flow of remaining component material laterally within said inclined flow pathway into said graded granular flow, whereby to create said graded granular flow exiting said transfer chute, and
- wherein at least a portion of the resulting graded granular flow is captured.

16. The system according to claim 15, wherein said preliminary particle separator comprises a splitter to separate said flow pathway into said plural streams of bulk material components.

17. The system according to claim 16, wherein said splitter comprises a splitter body presenting a leading edge to said flow path and two sides which diverge with respect to each other in said flow path to divide said flow path into said plural streams of bulk material components in a manner which does not create disturbance or turbulence in said flow path which might adversely result in re-mixing of particles in said flow path.

18. The system according to claim 17, wherein said transfer chute includes an angled surface upon which said remaining component material impinges and which directs said remaining component material downwardly along said flow pathway as said smooth controlled flow under the influence of gravity to provide said graded granular flow, and wherein the angle at which said remaining component material impinges upon said angled surface is selected to achieve flow of said remaining component material laterally across said angled surface as a sliding flow as said remaining component material flows downwardly along said inclined flow pathway.

19. The system according to claim 18, wherein said chute body has an inclined or angular rear wall providing said angled surface and said flow pathway is disposed internally within said chute body adjacent said rear wall.

20. The system according to claim 19, wherein said angled surface is inclined at an angle which is greater than an adopted stall angle for granular particles to be sized and separated.

21. The system according to claim 20, wherein said angle is greater than an adopted stall angle in the range of 60 to 65 degrees.

22. The system according to claim 15, wherein at least a portion of the resulting graded granular flow is formed into a separate stream and wherein said at least a portion of the captured granular flow is intercepted, said interception of the separate stream further comprising collecting or redirecting the separate stream.

23. The system according to claim 15, wherein said at least a portion of said resulting graded granular flow is screened, with smaller fractions generally below larger fractions.

24. The system according to claim 23, wherein said screening comprises part of a screening system having a plurality of screens, wherein said plurality of screens operate in series and wherein said resulting graded granular flow advances sequentially from one screen to the next, thus successively further separating said resulting graded granular flow into graded batches.

* * * * *